(12) United States Patent
Kent et al.

(10) Patent No.: US 6,558,716 B1
(45) Date of Patent: May 6, 2003

(54) PROCESS FOR INCORPORATING WHEY PROTEIN INTO CHEESE

(75) Inventors: Clinton Kent, Evanston, IL (US); Mark Kijowski, Chicago, IL (US); Bruce Campbell, Glenview, IL (US); Jochen Klaus Pfeifer, Evanston, IL (US); Christopher Burl Smith, Hanover Park, IL (US); Rashad Bahrani, Libertyville, IL (US); Joy Lee, Glenview, IL (US); Tim Nellenback, Arlington Heights, IL (US); Rashida Uchefuna Byrd, Chicago, IL (US); William Zaikos, Chicago, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/459,523

(22) Filed: Dec. 13, 1999

Related U.S. Application Data

(60) Provisional application No. 60/115,817, filed on Jan. 14, 1999.

(51) Int. Cl.$^7$ ................................................. A23C 9/12
(52) U.S. Cl. ............................. 426/36; 426/34; 426/41; 426/580; 426/582; 426/519
(58) Field of Search .......................... 426/34, 36, 580, 426/582, 38, 39, 40, 41, 42, 43, 519, 520, 521, 522

(56) References Cited

U.S. PATENT DOCUMENTS

| | | |
|---|---|---|
| 3,535,304 A | 10/1970 | Muller et al. |
| 4,205,090 A | 5/1980 | Maubois et al. |
| 5,356,639 A | 10/1994 | Jameson et al. |
| 5,470,593 A | 11/1995 | Meilinger et al. ............. 426/36 |
| 6,120,809 A * | 9/2000 | Rhodes ........................ 426/36 |

FOREIGN PATENT DOCUMENTS

| | | |
|---|---|---|
| WO | WO 99 21430 | 5/1999 |

OTHER PUBLICATIONS

International Search Report; International Appl. No. PCT/00/30/0244; Mailed Mar. 8, 2001.

Ernstrom et al., *J. Dairy Science* 63:228–234 (1980).

Banks, JM, Stewart, G., Muir, DD and West, IG [1987]. Increasing the yield of Cheddar cheese by the acidification of milk containing heat–denatured whey protein. *Milchwissenschaft* 42 (4), pp. 212–215.

Law, AJR, Banks, JM, Horne, DS, Leaver, J. and West, IG [1994]. Denaturation of the whey proteins in heated milk and their incorporation into Cheddar cheese. *Milchwissenschaft* 49 (2), pp. 63–67.

Guinee, Timothy P., Pudja, Predrag D., Reville, William J., Harrington, Dermot, Mulholland, Edward O., Cotter, Myriam, and Cogan, Timothy M. [1995]Composition, Microstructure and Maturation of Semi–hard Cheeses from High Protein Ultrafiltered Milk Retentates With Different Levels of Denatured Whey Protein. *Int. Dairy Journal* 5, pp. 543–568.

Dybing, ST and Smith, DE [1998]. Dairy Foods—The Ability of Phosphates or—Carrageenan to Coagulate Whey Proteins and the Possible Uses of Such Coagula in Cheese Manufacture. *J. Dairy Sci.* 81 (2) pp. 309–317.

* cited by examiner

*Primary Examiner*—Leslie Wong
(74) *Attorney, Agent, or Firm*—Fitch, Even, Tabin & Flannery

(57) ABSTRACT

The present invention provides processes for making a stable cheese product supplemented with functionally enhanced whey protein. In a preferred embodiment of these methods, the cheese product is cream cheese. The added whey protein is functionally enhanced by exposing cheese curds or dairy liquids containing the whey protein to controlled heat treatment and/or treatment at high shear rates. The invention further provides a stable cheese product that is characteristic of a particular variety of cheese and that is supplemented with functionally enhanced whey protein. In a preferred embodiment, the supplemented cheese product is cream cheese.

20 Claims, 2 Drawing Sheets

PROCESS FOR INCORPORATING WHEY PROTEIN INTO CHEESE

RELATED APPLICATIONS

This application is based on, and claims benefit of, U.S. Provisional Application Ser. No. 60/115,817, filed on Jan. 14, 1999.

FIELD OF THE INVENTION

This invention relates to a method that allows or provides for increased incorporation of whey protein (in the form of "functionally enhanced" whey protein) in cheese. The method uses high shear mixing and carefully controlled heat treatment to provide the functionally enhanced whey protein. This functionally enhanced whey protein can be incorporated into cheese products to provide stable products having increased levels of whey protein without adversely affecting the organoleptic properties of the resulting cheese products.

BACKGROUND OF THE INVENTION

Cheese compositions are generally prepared from dairy liquids by processes that include treating the liquid with a coagulating or clotting agent. The coagulating agent may be a curding enzyme, an acid, or a suitable bacterial culture or it may include such a culture. The coagulum or curd that results generally incorporates casein that has been suitably altered by the curding process, fats including natural butter fat, and flavorings arising during the processing (especially when using a bacterial culture as the coagulating agent). The curd is usually separated from the whey. The resulting liquid whey generally contains soluble proteins not affected by the coagulation; such proteins are, of course, not incorporated into the coagulum.

Nevertheless, whey proteins have high nutritive value for humans. In fact, the amino acid composition of such whey proteins is close to an ideal composition profile for human nutrition. Whey proteins are also understood to have superior emulsifying capabilities in comparison with casein. Without wishing to be bound by theory, the incorporation of whey protein is expected to reduce defects such as phase separation during processing, and, in the case of cream cheese, to also provide a smoother creamier product. In addition, such whey proteins provide a low cost dairy product which, if successfully incorporated into cheese products, would significantly increase the overall efficiency and effectiveness of the cheese-making process.

Unfortunately, methods or attempts to incorporate or use whey protein in cheese products have generally been unsuccessful. For example, whey proteins have been concentrated or dried from whey and then recombined with cheese (see, e.g., Kosikowski, Cheese and Fermented Foods, 2nd ed., Edwards Brothers, Inc., Ann Arbor, Mich., 1977, pp. 451–458). The whey proteins recovered from such procedures, however, do not have the appropriate or desired physical and chemical properties required for good or high quality natural cheeses or process cheeses.

An alternative approach has been to coprecipitate whey proteins with casein (see, e.g., U.S. Pat. No. 3,535,304). Again, however, the final product of this process lacks the proper attributes for making good or high quality processed and imitation cheeses. A further attempt to incorporate whey proteins into cheese products has employed ultrafiltration of milk to concentrate all the components, such as the casein, the whey protein, and the butterfat, that do not permeate the ultrafiltration membrane. When such a composition is coagulated by contact with an acid or rennet, a curd is formed. This curd, however, loses considerable quantities of the whey protein when compacted. For example, in U.S. Pat. No. 4,205,090 milk was concentrated to about one-fifth of its original volume. The resulting curd prepared from such concentrate could only be used to provide soft cheeses such as Camembert or Roblechon.

Ernstrom et al. (J. Dairy Science 63:2298–234 (1980)) described a process in which milk was concentrated to about 20 percent of the original volume by ultrafiltration, diafiltration, and evaporation. The resulting composition was inoculated with a cheese starter to ferment the lactose and form a cheese base. This base can be used to replace natural cheese components of process cheese. This process does not, however, employ any renneting or curding step to prepare a cheese curd.

U.S. Pat. No. 5,356,639 discloses a process for the production of a fermented concentrate from various milk products (e.g., whole milk, skim milk, or milk with added milk components); the fermented concentrate was usable to make cheese. The process included the steps of (1) selectively concentrating milk; (2) increasing the ionic strength of the concentrate to maintain the milk in the liquid phase and therefore prevent formation of a coagulum both during and after fermentation; (3) fermenting the concentrate with lactic acid producing bacteria; and (4) removing water from the fermented liquid concentrate. The final product includes substantially all of the whey proteins originally present in the milk.

Banks et al. (*Milchwissenschaft* 42:212–215 (1987)) disclose that heating milk at temperatures from 95° C. to 140° C. and then acidifying permits a modest increase in protein content in the cheese upon Cheddar production. The resulting cheese, however, developed a bitter off-flavor in this process. Law et al. (*Milchwissenschaft* 49:63–37 (1994)) also reported that heat treatment of milk prior to cheddaring results in reduction of proteins in whey and/or in acid filtrates of the milk.

Dybing et al. (*J. Dairy Sci.* 81:309–317 (1998)) suggested that whey protein could be incorporated into cheese curd by concentrating the milk components, coagulating whey proteins using a variety of agents, and renneting a composition containing the coagulated whey protein and concentrated milk components. Unfortunately, none of the methods were successful in producing whey protein that could be recovered as a cheese product.

Guinee et al. (*Int. Dairy Journal* 5:543–568 (1995)) reviewed the general state of the art relating to incorporation of whey protein into cheese or cheese products. High-heat treatment of milk impairs rennet coagulation, curd syneresis, curd structure and texture, as well as functional properties such as meltability and stretchability of the resulting cheese. The heat treatment of milk, after being curded to form semi-hard cheeses, does allow production of cheeses having higher whey protein levels. Unfortunately, such cheeses also exhibit higher moisture levels, lower pH values, poorer curd fusion, and lower yield (fracture) values during ripening.

An additional way in which expenses in manufacturing cheeses can be reduced is to minimize the content of components that are costly, and to increase the content of components that are inexpensive. Dairy liquids based on milk, containing casein, are relatively expensive, and their use in cheese manufacture increases the cost of the cheeses that result. Thus it would be advantageous to reduce the content of casein-containing dairy liquids in the manufacture of cheeses. It is found in practice, however, that reducing casein and replacing it with a less functional ingredient such as lactose or fat adversely affects texture and emulsion stability during processing. This disadvantage likewise persists when whey proteins that have not been functionally enhanced by the methods of the present invention, are used in an effort to supplement the lost casein.

As suggested above, in spite of many attempts documented over almost three decades, there remains a need for cheese curd and cheese products with an optimal incorporation of whey protein without significant reduction of organoleptic properties. There also remains a need for a method of producing such cheese curd and/or cheese products which allows for the increased incorporation of whey protein in the cheese curd and/or cheese product and which, at the same time, allows for retaining the organoleptic properties normally associated with high quality cheese curd and/or cheese product. Additionally, there remains for a cheese-making process which provides increased yields and efficiencies by incorporating significant levels of whey protein in the resulting cheese products without significantly modifying the organoleptic properties of the resulting cheese products. There further remains a need to reduce the use of casein-containing dairy liquids in cheese products that maintain pleasing organoleptic qualities and flavor of the product. The present invention responds to these long-felt needs and provides such methods and cheese compositions.

SUMMARY OF THE INVENTION

The present invention provides a process for making a stable cheese product supplemented with whey protein, said method comprising the steps of:

(i) preparing a cheese curd;
(ii) preparing a whey protein composition;
(iii) combining the cheese curd and the whey protein composition to form a whey protein-cheese curd blend; and
(iv) subjecting the whey protein-cheese curd blend to high shear and an elevated temperature for a time sufficient to provide a stable cheese product supplemented with whey protein. The heat treatment effectively transforms the whey protein to produce a "functionally enhanced" whey protein which allows for the formation of a stable cheese product containing the functionally enhanced whey protein. Preferably, the blend is homogenized at a pressure of about 1,000 to about 8,000 psi and treated at a temperature from about 175 to about 215° F. for about 2 to about 60 minutes. More preferably, the blend is homogenized at a pressure of about 1,500 to about 6,000 psi and treated at a temperature from about 180 to about 205° F. for about 5 to about 45 minutes. Even more preferably, the blend is homogenized at a pressure of about 3,500 to about 5,000 psi and treated at a temperature from about 180 to about 205° F. for about 5 to about 30 minutes.

In an alternative process for making a stable cheese product supplemented with whey protein, the steps include:

(i) combining a whey protein composition with a dairy liquid to form a culturable mixture;
(ii) subjecting the mixture to a high shear homogenization and temperature treatment that is effective to functionally enhance the whey protein, such that it is substantially incorporated into the milk fat-casein structure, thereby stabilizing the culturable mixture;
(iii) culturing the stabilized mixture with a culture that provides a particular variety of cheese to form whey and a cheese product characteristic of the particular variety of cheese;
(iv) heating the cultured mixture; and
(v) separating the cheese product from the whey in the heated mixture.

In significant embodiments of this method, the mixture is homogenized in step (ii) at a pressure from about 1,500 to about 3,500 psi. In a more significant embodiment, the homogenization is carried out at a pressure from about 2,000 to about 3,000 psi. The temperature treatment in step (ii) entails heating the mixture to about 180 to about 220° F. for about 1 to about 10 minutes. Preferably, the mixture is heated to about 195 to about 205° F. for about 4 to about 6 minutes. After the homogenization step, that may include or be combined with an ultrafiltration step, the mixture is subjected to an extended controlled heat treatment. In a preferred embodiment, the cultured mixture is heated in step (iv) to a temperature from about 165 to about 210° F. In an additional preferred embodiment, the cultured mixture is treated in step (iv) at a temperature from about 195 to about 205° F. The characteristic cheese product thus obtained stably incorporates the functionally enhanced whey protein. In preferred embodiments of these methods, the cheese curd is a cream cheese curd, and the cheese product is cream cheese.

In important embodiments of both processes, the whey protein composition is selected from the group consisting of dry whey protein concentrate (WPC), liquid whey protein concentrate (WPC), whey protein isolate, liquid or dried sweet whey, liquid or dried acid whey, and mixtures thereof. Dry whey protein is combined at a proportion from at least about 2 percent by weight of the total weight of the blend to at most about 12 percent of the total weight of the blend. Alternatively, liquid whey protein concentrate (WPC) is added at a proportion such that the whey protein concentrate solids contained therein are present at a proportion from at least about 2 percent by weight of the total weight of the blend to at most about 12 percent by weight of the total weight of the blend. Furthermore, whey protein isolate, which contains about twice the concentration of whey protein solids as does whey protein concentrate, can be used in the present invention. Accordingly, about one-half the volume of whey protein isolate can be used, compared to whey protein concentrate. Liquid or dried sweet whey and liquid or dried acid whey can also be used. Mixtures of two or more of these whey protein compositions can also be used if desired.

The invention further provides a stable cheese product that is characteristic of a particular variety of cheese supplemented with whey protein that includes the cheese product and functionally enhanced whey protein. In a preferred embodiment, the cheese product is cream cheese.

The methods and products of the invention further provide for reducing the content of casein-containing dairy liquids in the processes for making cheeses, and in the resulting cheese products. This reduction is attainable since the incorporated functionally enhanced whey protein effectively replaces the functionality of the casein that has been eliminated.

DETAILED DESCRIPTION OF THE INVENTION

Figure 1:
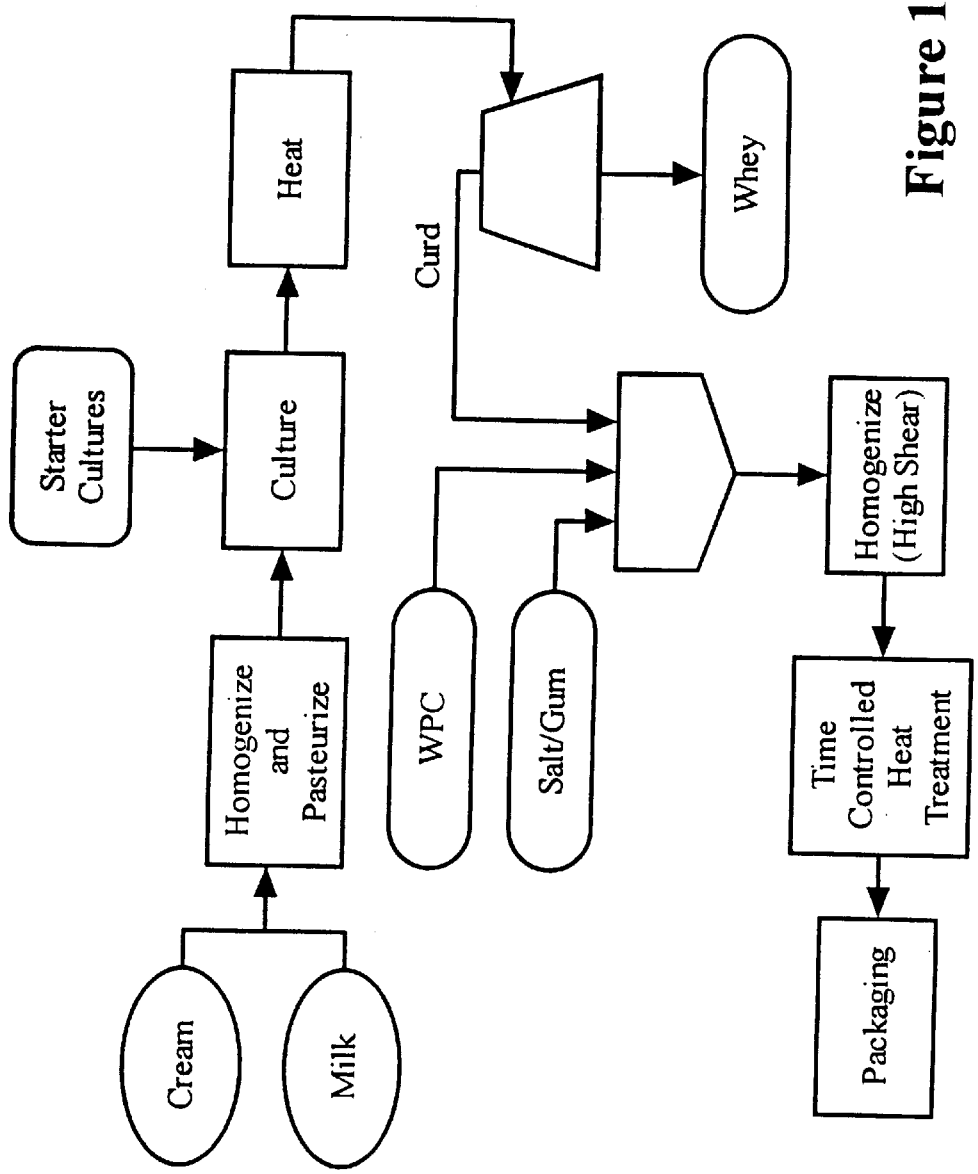
FIG. 1 provides a schematic flow diagram for a process for incorporating functionally enhanced whey protein into cream cheese curds in which the whey protein is blended with cream cheese curds and stabilized by homogenizing at high shear and heat treatment for a controlled time.

The present invention provides processes for making a stable cheese product supplemented with functionally enhanced whey protein. As used herein, the term "stable" as applied to the resulting cheese product relates to characteristics such as the product having minimal syneresis, an acceptably firm texture, and minimal disruption of the emulsion during processing. As used herein, the terms "functionally enhance", "functionally enhanced", and synonymous expressions, relate to an alteration in the structure and properties of whey proteins such that at least 70 percent, and as high as 99 percent, of the whey protein is retained in cheese curd, rather than being lost in the non-curd components (e.g., whey). Without wishing to be bound by theory, it is thought that this enhanced functionality is related to an increase in the crosslinking of the whey protein, especially the β-lactoglobulin, which allows the whey protein to be enriched at the oil/water interface.

In one method of the invention, a cheese curd characteristic of a particular variety of cheese is combined with a whey protein composition that includes, for example, dry whey protein concentrate, liquid whey protein concentrate, whey protein isolate, liquid or dried sweet whey, liquid or dried acid whey, and mixtures thereof. The resulting blend is homogenized under conditions of high shear and treated for a time and at a temperature such that these procedures are effective to transform the whey protein such that it is incorporated into the particular cheeseproduct so as to achieve the texture and stability associated with conventional cheese products. In a second method of the invention, a whey protein composition (e.g., dry whey protein concentrate, liquid whey protein concentrate, whey protein isolate, liquid or dried sweet whey, liquid or dried acid whey, and mixtures thereof) is combined with a dairy liquid to form a culturable mixture that is homogenized and heated so as to transform the whey protein and permit it to be incorporated into the culturable mixture. The stabilized mixture is then cultured with a culture that provides a particular variety of cheese to form whey and the characteristic cheese product which stably incorporates the whey protein.

Whey proteins have high nutritive value for humans, and can provide a favorable sensorial quality, conferring a creamy and spreadable quality to dairy products in which they are incorporated. Whey proteins also can enhance cheesecake baking performance, when added to a cream cheese product, especially in cheesecake formulations with low protein content. In addition, their cost is low, compared to the other proteins present in milk, making it desirable to incorporate whey proteins into cheese products. The present methods have overcome the difficulties previously encountered in dairy production in which attempts to incorporate whey proteins into cheeses, such as cream cheese products, have led to excessive separation losses and concomitant decreases in yield and/or to very poor firmness of the finished product.

Additional advantages provided by the present methods and compositions relate to increased efficiencies in production. In one method, in which whey protein is combined with a particular cheese curd, the overall process yield is improved since there is little opportunity for loss of whey protein to occur. Furthermore, pH variability in the finished product is diminished, since the added whey protein acts as a buffer and helps neutralize excess acidity that may develop during culturing or fermentation. Additionally in these methods, the high temperature treatment employed is effective in inactivating microbiological contaminants which may be introduced with the various components. Additional efficiency is obtained as a result of the reduction in the amount of casein-containing dairy liquids that are used.

Figure 2:
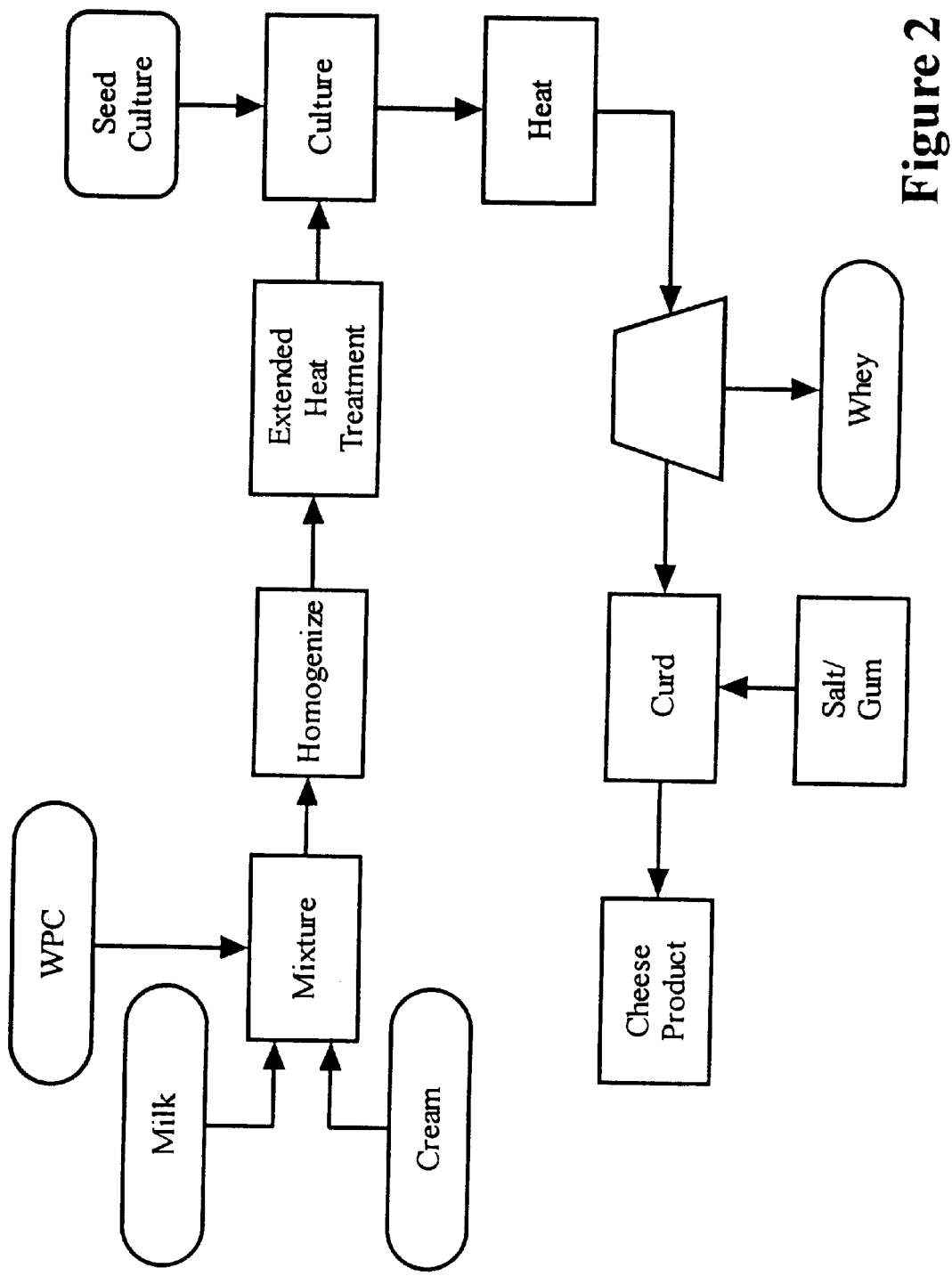
FIG. 2 provides a schematic flow diagram for a process for incorporating functionally enhanced whey protein into cream cheese curds in which the whey protein is mixed with cream and milk and stabilized by extended heat treatment prior to culturing to develop the cream cheese curds.

In the present invention, a cheese curd is obtained using conventional techniques. As those skilled in the art understand, the actual curd produced will depend on the particular variety of cheese that is desired. In large part, the type of culture selected to form the curd will be determined by the particular cheese variety desired. Of course, the specific composition of the milk or dairy product used will also play a role in determining the characteristic flavors and aromas in the resulting cheese. As those skilled in art know, the milk or dairy product composition may be varied, for example, by using milk of varying fat levels (i.e., no-fat or skim milk, low-fat milk, full-fat or whole milk, whole milk with added fat, and the like). The milk or dairy product composition may also be varied, for example, by inclusion of additional dairy components such as milk solids, cream, and the like. In a preferred embodiment of the present invention, the dairy liquid contains a significant proportion of added cream, and the culture employed in the curding of this dairy liquid is characteristic for cream cheese. Especially preferred processes are illustrated in FIGS. 1 and 2. The resulting culture provides a cream cheese curd and whey. In alternative embodiments, milk compositions not including additional cream may be curded and/or cultured. Examples of particular cheese varieties that may be prepared by the methods of the present invention include by way of nonlimiting example, cream cheese, cottage cheese, cheddar cheese, and mozzarella cheese.

In one inventive method directed to an embodiment in which cream cheese is prepared (see FIG. 1), the milk and cream are combined. Advantageously, they are blended in a ratio which provides for a significantly lower protein:fat ratio than in conventional cream cheese mix. The mixture is homogenized, optionally ultrafiltered via a membrane with a suitable pore size such as, for example, 1.1 mm (not shown in FIG. 1), and exposed to a brief pasteurization treatment at about 178° F. After cooling, the resulting mixture is seeded with a starter culture for cream cheese and allowed to ferment under conditions that are appropriate for the curdling of the mixture to form cream cheese curds and whey. The curdling is induced by the acidity resulting from the fermentation of the lactose in the blend to lactic acid. Fermentation is terminated by a brief exposure to an elevated temperature that inactivates the culture. The terminated culture is then separated, for example, by a centrifugal separator, discarding the whey and retaining the cream cheese curd.

The curd is then combined with whey protein concentrate, which may be either dried solids or a concentrated liquid with a high solids content (or other whey protein compositions). In general, the proportion of whey protein that is added may range from at least about 2 percent by weight to at most about 12 percent by weight. Optionally, whey, dried whey, dried sweet whey, and/or water may also be added to the mixture. Additionally, a composition including salt and a gum, such as an edible vegetable gum, may be combined with the curd and the whey protein. Additional cream may also be added as an option at this point. The whey protein is dispersed and hydrated in the cream cheese curd by a blending operation. This blend is then subjected to two operations whose result is to transform the structure of the whey protein such that the functionally enhanced whey protein is stably incorporated into the cheese curd. In one of these operations, the mixture is homogenized in a high shear homogenizer. Preferably, the blend is homogenized at a pressure of about 1,000 to about 8,000 pounds per square inch (psi). More preferably, the blend is homogenized at a pressure of about 1,500 to about 6,000 psi, and most preferably at about 3,500 to about 5,000 psi. Homogenization provides reduced particle sizes in the mixture. It is preferred to attain a particle size less than about 2.5 m, and more preferably, a particle size less than about 1.5 m. Suitable homogenizers that may be employed for this purpose are well-known in the fields of dairy science and food chemistry.

The second operation to which the blend is subjected is a controlled treatment at an elevated temperature. In. general, the blend is treated at from about 175 to about 215° F. for about 2 to about 60 minutes. Preferably, this treatment is at a temperature from about 180 to about 205° F. for about 5 to about 30 minutes. Without wishing to be bound by.theory, it appears that heat treatment induces crosslinking of the whey protein β-lactoglobulin. A preferred extent of crosslinking to achieve enhanced functionality of whey protein is about 60 percent or greater, and a more preferred extent is about 80 percent or greater. Various ways of conducting the controlled elevated temperature treatment are known to workers of skill in dairy science and food chemistry. Such methods include, for example, heating in a thermally jacketed batch vessel, or passage through a heat exchange tube in which the fluid velocity and the length of the tube establish the duration of the treatment. The preferred sequence of these operations is one in which the homogenization precedes the temperature treatment. The reverse sequence, however, also is found to produce an effective amount of functionally enhanced whey protein. In general, the homogenization and heat treatment can also be carried out at the same time, for example, by heating the blend before and/or during the homogenization. Alternatively, if one of these procedures is carried out first, the other can follow within an operationally convenient time. The effect achieved by the combination of the homogenization and the heat treatment is that the structure of the whey proteins is transformed in a way that enhances their stable incorporation into the cheese curd.

Another preferred method for the production of cream cheese (or other cheese product) is illustrated in FIG. 2. In this process, the starting milk containing whey protein is mixed with any added whey protein concentrate (or other suitable whey protein composition) to form a culturable mixture. The mixture is then subjected to a high shear homogenization and temperature treatment that effectively enhances the functionality of the whey protein, such that it is substantially incorporated into the milk fat-casein structure. As a result the culturable mixture is stabilized.

The blend or mixture formed using the homogenization and heat treatment steps of the present invention is then fermented to produce a stable cheese product having significant levels of whey protein. Correspondingly, the amount of whey protein in the later-separated whey will be significantly reduced. More particularly, the blend containing milk (and optional levels of cream and/or whey protein concentrate) is subjected to the homogenization and heat treatment steps of the present invention to form a stable cheese product containing whey protein. In significant embodiments of this method, the homogenization is carried out at a pressure from about 1,500 to about 3,500 psi. In more significant embodiments, the mixture is homogenized at a pressure from about 2,000 to about 3,000 psi. In general, the mixture is heated to about 180 to about 220° F. for about 1 to about 10 minutes. Preferably, the mixture is heatedfrom about 195 to about 205° F. for about 4 to about 6 minutes.

After the homogenization step, that may include or be combined with an ultrafiltration step (not shown), the mixture is seeded with a starter culture for cream cheese. It is permitted to ferment for an appropriate period of time sufficient to develop cream cheese curds and whey, and then treated with a brief exposure to high temperature. In an important embodiment, the temperature of the latter brief exposure is from about 165 to about 210° F., and more importantly, the temperature is from about 195 to about 205° F. The curds are then separated from the whey by a process such as centrifugation. If desired, salt and a gum, such as a vegetable gum, may be added to the curd, and the final cheese product is prepared.

The combination of homogenization and controlled treatment at an elevated temperature of the dairy compositions of the invention that contain added whey protein are effective to incorporate the whey protein into the cheese products of the invention. As noted above, these treatments transform the whey protein such that it becomes functionally enhanced, resulting in its stable incorporation into the cheese products described herein. Homogenization reduces the particle size of the cheese compositions. In important aspects of the invention, the particle size is preferably reduced to a particle size less than about 2.5 m, and more preferably, a particle size less than about 1.5 m. Furthermore, it appears that the controlled heat treatment of the invention induces crosslinking of the β-lactoglobulin component of the whey protein. A preferred extent of crosslinking to achieve enhanced functionality of whey protein is about 60 percent or greater, and a more preferred extent is about 80 percent or greater. The cheese products resulting from these methods contain functionally enhanced whey protein, and provide cheese products having agreeable organoleptic properties and enhanced stability.

The following examples are provided to illustrate the invention but not to limit the scope of the invention. Unless noted otherwise, all percentages are by weight.

EXAMPLE 1

Cream Cheese Formulations Incorporating, or Omitting, Whey Protein Concentrate. A comparison of formulations used in preparing conventional cream cheese and the cream cheese of the invention that is supplemented with whey protein concentrate is provided in Table 1.

TABLE 1

Cream cheese formulations.

| Component | Conventional cream cheese | Inventive cream cheese |
|---|---|---|
| Whole milk | 200.0 lbs | 116.6 lbs |
| Cream | 66.3 lbs | 70.4 lbs |
| Whey protein concentrate, 35% | — | 3.9 lbs |
| Salt | 0.71 lbs | 0.70 lbs |
| Carob gum | 0.26 lbs | 0.25 lbs |
| Approximate cost (per lb.)* | $1.02 | $0.97 |

*Of course, costs can vary greatly depending on commodity prices in effect at any given time. Thus, these values provide relative cost comparisons only.

EXAMPLE 2

Cream cheese production incorporating whey protein concentrate into cream cheese curd. A cream cheese composition was prepared by blending whey protein concentrate into cream cheese curds, following the general flow diagram presented in FIG. 1. Milk (1,247 lbs) was mixed with 753 lbs of cream at 40° F. The components of the two liquids are indicated in Table 2. The resulting milk and cream composition is given in Table 3.

TABLE 2

Composition of Milk and Cream Employed in Cream Cheese.

|  | Milk (%) | Cream (%) |
| --- | --- | --- |
| Total Solids | 12.02 | 45.50 |
| Fat | 3.58 | 41.00 |
| Protein | 3.22 | 1.71 |
| Casein | 2.51 | 1.34 |
| Whey Protein | 0.55 | 0.29 |
| Lactose | 4.52 | 2.41 |

TABLE 3

Composition of Cream Cheese Mix.

| Component | Amount (%) |
| --- | --- |
| Total Solids | 24.63 |
| Fat | 17.67 |
| Protein | 2.65 |
| Casein | 2.07 |
| Whey Protein | 0.45 |
| Lactose | 3.72 |

The mixture was heated from 40 to 140° F. and homogenized at 2,500 psi. The mixture was then pasteurized at 178° F. for 18 seconds, and cooled to 72° F. This mixture was inoculated with 0.75 percent of a starter culture for cream cheese prepared using whole milk and commercial cultures. The culture was permitted to ferment for 18 hours at ambient temperatures, resulting in coagulation; at this point the pH was determined to be 4.50. The coagulated mixture was heated to 180° F., and centrifuged to provide 1016 lbs cream cheese curd and 982 lbs whey. To the curd were added 42.2 lbs FDA whey protein concentrate, 7.5 lbs salt, and 2.7 lbs carob, xanthan, and/or guar gum. The composition of the whey protein concentrate is provided in Table 4.

TABLE 4

Whey protein concentrate.

| Component | Amount (%) |
| --- | --- |
| Total Solids | 96.0 |
| Fat | 3.5 |
| Protein | 32.6 |
| Lactose | 48.0 |

The blend of curd, whey protein concentrate, salt, and gum was subjected to homogenization using a pressure of 5,000 psi developed in a Model 165 homogenizer (Gaulin Corp., Everett, Mass.), and exposed to a temperature of 200° F. for 15 minutes using a carefully controlled flow rate through a heat exchanging tube of the correct length such that the velocity provided the intended time of exposure. The composition of the final product (1070 lbs) is shown in Table 5.

TABLE 5

Composition of Cream Cheese Incorporating Whey Protein Concentrate.

| Component | Amount (%) |
| --- | --- |
| Solids | 45.50 |
| Fat | 33.10 |
| Protein | 6.02 |
| Casein | 3.83 |
| Whey Protein | 2.00 |
| Lactose/Lactic Acid | 4.57 |

EXAMPLE 3

Cream cheese production incorporating whey protein concentrate into the milk and cream mixture. A cream cheese composition is to be prepared by blending whey protein concentrate into a milk and cream mixture, following the general flow diagram presented in FIG. 2. Milk (104.8 lbs) are to be mixed with 73.2 lbs cream and 5.12 lbs whey protein concentrate at 40 ° F. The components present in the milk and cream are comparable to that indicated in Table 2 of Example 2, and the whey protein concentrate are identical to those shown in Table 3. The resulting composition is shown in Table 6.

TABLE 6

Composition of Cream Cheese Mix.

| Component | Amount (%) |
| --- | --- |
| Total Solids | 28.5 |
| Fat | 18.8 |
| Protein | 3.5 |
| Casein | 2.1 |
| Whey Protein | 1.4 |
| Lactose | 4.7 |

The mixture is to be heated from 40 to 140° F. and subjected to homogenization at 2,100 psi. The mixture is then to be heat treated at 203° F. for 5 minutes, then cooled to 72° F. This mixture is to be inoculated with 0.75 percent of a bulk commercial starter culture. The culture was permitted to ferment for 14 h at 72° F., at which point the pH is to be about 4.55. The fermented mixture is to be heated to 203° F., and centrifuged to provide about 99.1 lbs cream cheese curd with a moisture content of about 55.3 percent and 84 lbs whey. To the curd are to be added 0.7 lbs salt, and 0.25 lbs carob gum to obtain 100 lbs finished product, whose composition is shown in Table 7.

TABLE 7

Composition of Cream Cheese Incorporating Whey Protein Concentrate.

| Component | Amount (%) |
| --- | --- |
| Moisture | 54.8 |
| Fat | 34.0 |
| Protein | 5.5 |
| Lactose | 3.0 |
| Salt | 0.7 |

EXAMPLE 4

Preparation of Cheddar Cheese Incorporating Whey Proteins. A cheddar cheese composition is to be prepared by blending whey protein concentrate into cheddar cheese curds, following the general flow diagram presented in FIG. 1. A dairy liquid that is essentially whole milk is to be heated from 40 to 140° F. and subjected to ultrafiltration using a 1.1 mm filter. The retentate is to be treated at 178° F. for 18 s, then cooled to 72° F. This mixture is to be inoculated with a starter culture for cheddar cheese prepared using hydrated non-fat dry milk. The culture is to be permitted to ferment for about 14 h at about 72° F., at which point the pH falls to about 5.3 to about 4.5. The fermented mixture is to be heated to 180° F., and separated to provide cheddar cheese curds and whey. To the curds are to be added whey protein concentrate, salt, and carob gum. The mixture is to be subjected to ultrafiltration, and then treated by high shear, using a pressure of 5,000 psi developed in model 165 homogenizer (Gaulin Corp., Everett, Mass.), and exposed to a temperature of about 188° F. for about 1.18 minutes using a carefully controlled flow rate through a heat exchanging tube of the correct length such that the velocity will provide the intended time of exposure. The cheddar cheese curd supplemented with functionally enhanced whey protein is to be obtained at the conclusion of the heat treatment. If necessary additional cheddar culture is to be added for aging.

EXAMPLE 5

High shear and high temperature treatment of mozzarella cheese curd mixed with whey protein concentrate. A procedure comparable to that described in Example 2 and FIG. 1 is to be performed. A rennet and/or culture characteristic of mozzarella is to be employed. The pressure applied to the mixture of the cheese curd and the whey protein concentrate is to be about 5,000 psi using a homogenizer.

EXAMPLE 6

Preparation of Soft Cream Cheese Incorporating Whey and Whey Proteins. Spreadable soft cream cheese products were prepared by blending neufchatel or low solids fresh cream cheese curd with ingredients such as dried whey protein concentrate, whey, and/or water. Each resulting blend was subjected to a controlled time, temperature and shear treatment, following the general flow diagram presented in FIG. 1. The compositions, their properties, and processing conditions are given in Table 8. Among the advantages that accrue are the ability to provide flavor and texture profiles preferred by consumers while obtaining significant reduction in raw material costs.

TABLE 8

Cream cheese compositions.

| Product | Brick Cream Cheese | Soft Spread | Light Cream Cheese |
|---|---|---|---|
| Moisture (%) | 54.6 | 59.0 | 67.3 |
| Fat (%) | 33.6 | 30.0 | 15.0 |
| Yield Stress (Pa.) | 3000–4000 | 2000–3000 | 1600–2200 |
| Cream Cheese Curd* (%) | 95.30 | 85.00 | |
| Neufchatel Cheese Curd** (%) | | | 63.80 |
| Whey Protein Concentrate (%) | 3.80 | 1.50 | 8.00 |
| Dried Sweet Whey (%) | | 1.50 | |
| Cream (%) | | 0 to 5 | |
| Acid whey (%) | | 10.95 | 26.63 |
| Vitamin A (%) | | | 0.007 |
| Sorbic Acid (%) | | | 0.05 |
| Lactic Acid (%) | | | 0.30 |

TABLE 8-continued

Cream cheese compositions.

| Product | Brick Cream Cheese | Soft Spread | Light Cream Cheese |
|---|---|---|---|
| Salt (%) | 0.70 | 0.80 | 0.85 |
| Gum (%) | 0.20 | 0.25 | 0.36 |
| Homogenization Pressure (psi) | 5000 | 1500 | 5000 |
| Heating Temp. (° F.) | 200 | 190 | 200 |
| Heating Time (min) | 17 | 8 | 10 |

*57.1% moisture from 0.15 protein to fat mixture.
**64.3% moisture from 0.38 protein to fat mixture.

The inventive cheeses generally had a better balance of organoleptic attributes and were generally preferred in evaluation tests over a conventional cheeses in appearance; flavor, texture, spreadability, and aftertaste.

EXAMPLE 7

Preparation of Light Cream Cheese Using a Neufchatel Base Incorporating Whey and Whey Proteins. This example illustrates the preparation of an inventive Neuchatel light cream cheese and compares it to the formulation for a conventional light cream cheese, using the process of FIG. 1. The comparison is shown in Table 9.

TABLE 9

Comparison of Conventional Light Cream Cheese and Inventive Light Cream Cheese.

| Conventional Light Cream Cheese | | Inventive Light Cream Cheese | |
|---|---|---|---|
| Ingredients | Wt. % | Ingredients | Wt. % |
| Cream Cheese | 45.20 | Neufchatel curd | 64.54 |
| Lowfat Cottage Cheese | 39.85 | | |
| Whey Protein Concentrate | 6.70 | Whey Protein Concentrate* | 7.52 |
| Water | 6.61 | Cream Cheese Whey | 27.01 |
| Cream | 0.71 | | |
| Lactic Acid (88%) | 0.50 | Lactic Acid (88%) | 0.20 |
| Salt | 0.15 | Salt | 0.45 |
| Sorbic Acid | 0.10 | Sorbic Acid | 0.10 |
| Guar Gum | 0.07 | Xanthan Gum | 0.04 |
| Carob Gum | 0.04 | Carob Bean Gum | 0.15 |
| Starter Distillate | 0.02 | Starter Distillate | 0.02 |
| Vitamin A | 0.01 | Vitamin A | 0.01 |
| Approximate cost* ($/lb) | 0.70 | Approximate cost* ($/lb) | 0.51 |

*FDA 35.
**Of course, costs can vary greatly depending on commodity prices in effect at any given time. Thus, these values provide relative cost comparisons only.

The conventional light cream cheese was prepared by slurrying the low fat cottage cheese curd and water, heating the slurry for about 10 minutes, and blending the slurry with all other ingredients. The resulting blend was heated by direct steam injection, homogenizing the blend at 150 to 500 psi, and then packaged.

The inventive light cream cheese was prepared by blending cream cheese whey, lactic acid, salt, sorbic acid, starter distillate, xanthan gum, carob gum, and vitamin A to form a premix. The premix was then heated in a heat exchanger to 190° F. and blended with the neufchatel curd and the whey protein concentrate. The blend was then homogenized at 5,000 psi, heated to 200° in a heat exchanger; held at 200° F. for about 8 minutes, cooled to 180° F. in a heat exchanger, and then held for at least 30 minutes.

It is seen from Table 9 that the inventive cream cheese uses less casein-containing cream cheese/cottage cheese curd than does the conventional cream cheese, and includes a higher proportion of whey protein than does the conventional cream cheese. The last line of Table 9 clearly shows the economic benefit of the inventive cream cheese formulation, for it costs about 28 percent less than the conventional formulation. Furthermore the use of whey protein allows for a decrease in fat content and increase in moisture level without sacrificing product quality.

EXAMPLE 8

Preparation of Spreadable Soft Cream Cheese Products Having Different Flavors. Spreadable soft cream cheese products were made by the inventive process, having differing blends that conferred differing flavors to, the final product. Three preparations, soft cream cheese of the invention (Table 10, sample 1), a "high cream flavor" soft cream cheese (sample 2), and a "high cultured flavor" soft cream cheese (sample 3) were prepared using the process represented in FIG. 1, and compared with conventional soft cream cheese. The formulations and properties of the resulting blends, are given in Table 10. In this Table, the major steps involved in the process are set off by heavy double horizontal lines.

Thus, the milk and first portion of cream (#1 in Table 10) are blended, homogenized, and pasteurized; the starter cultured is then added, and the mixture cultured to form the curd. After removing waste whey resulting from the separation step, the remaining curd is combined with the rest of the ingredients (including additional cream (#2 in Table 10)) for blending and the heating and homogenization step.

For the conventional cream cheese, a cultured dressing was prepared by blending cream, water, and non-fat dry milk and then pasteurizing the resulting blend. After culturing the blend using a starter culture, the cultured dressing was heated to 180° F. and a portion of the salt and carob gum was added. The remaining salt and gum was then added to the separated curd and the curd blended with the cultured dressing, followed by homogenization at 500 to 3,000 psi.

The inventive soft cream cheese spreads were blended by combining the separated curd with whey protein concentrate, additional cream (#2 in Table 10 for sample 2) or dried sweet whey (for sample 3), salt, and carob gum. The blends were then homogenized at 1,500 to 3,500 psi, heated in a heat exchanger to 190° F., held at 190° F. for 8 minutes, cooled in a heat exchanger to 180° F., held at 180° F. for at least 30 minutes, and then packaged.

It is seen from Table 10 that the inventive cream cheese uses less cream than does the conventional cream cheese, and includes whey protein, and in one case, dried sweet whey, whereas the conventional cream cheese omits these ingredients. The fat content and caloric value of the inventive compositions is lower than the corresponding values for the conventional cream cheese, in accord with contemporary consumer preferences. Furthermore, the economic benefit of the inventive cream cheese formulation is clearly apparent, for it costs about 15 percent less than the conventional formulation.

TABLE 10

Conventional and Inventive Soft Cream Cheese Blends.

| Ingredient | Conventional Cream Cheese (%) | Sample 1 (%) | Sample 2 (%) | Sample 3 (%) |
| --- | --- | --- | --- | --- |
| Whole Milk | 95.1 | 100.8 | 93.80 | 100.0 |
| Cream (#1) | 30.0 | 64.5 | 59.90 | 64.3 |
| Remove Waste Whey | −80.0 | −69.4 | −63.0 | −68.4 |
| Cream (#2) | 43.1 | | 5.00 | |
| Water | 6.2 | | | |
| Nonfat Dry Milk | 4.6 | | | |
| Whey Protein Concentrate (35%) | | 3.0 | 3.20 | 1.50 |
| Dried Sweet Whey | | | | 1.5 |
| Salt | 0.8 | 0.8 | 0.80 | 0.8 |
| Carob Gum | 0.25 | 0.25 | 0.25 | 0.25 |
| Calories (kcal/100 g) | 357 | 308 | 308 | 308 |
| Fat (g/100 g) | 34.5 | 30.0 | 30.0 | 30.0 |
| Approximate Cost* ($/lb) | 0.82 | 0.71 | 0.69 | 0.69 |

*Of course, costs can vary greatly depending on commodity prices in effect at any given time. Thus, these values provide relative cost comparisons only.

We claim:

1. A process for making a stable cheese product supplemented with functionally enhanced whey protein comprising the steps of:
   (i) preparing a cheese curd characteristic of a particular variety of cheese;
   (ii) combining the cheese curd with a whey protein composition comprising whey protein to form a whey protein-cheese blend; and
   (iii) homogenizing the blend under conditions of high shear and treating the blend for a time and at a temperature, such that the homogenizing conditions and the treating time and temperature are effective to enhance the functionality of the whey protein and to form a stable cheese product;
   wherein the whey protein composition is selected from the group consisting of dry whey protein concentrate, liquid whey protein concentrate, whey protein isolate, liquid or dried sweet whey, liquid or dried acid whey, and mixtures thereof, wherein the whey protein composition is added at a proportion such that the whey protein solids contained therein are present at a proportion from at least about 2 percent by weight of the total weight of the blend to at most about 12 percent by weight of the total weight of the blend, and wherein the cheese product stably incorporates the functionally enhanced whey protein and is characteristic of a particular variety of cheese.

2. The process described in claim 1, wherein the cheese curd is characteristic of a curd chosen from the group consisting of cream cheese cottage cheese, cheddar cheese, and mozzarella cheese, and the cheese product corresponds to the characteristic curd chosen.

3. The process described in claim 1, wherein whey protein composition is a dry whey protein concentrate.

4. The process described in claim 1, wherein whey protein composition is a liquid whey protein concentrate.

5. The process described in claim 1, wherein the blend is homogenized at a pressure of about 1,000 to about 8,000 pounds per square inch.

6. The process described in claim 1, wherein the blend is treated at a temperature from about 175 to about 215° F. for about 2 to about 60 minutes.

7. The process described in claim 5, wherein the blend is homogenized at a pressure of about 1500 to about 5,000 pounds per square inch.

8. The process described in claim 6, wherein the blend is treated at a temperature from about 180 to about 205° F. for about 5 to about 45 minutes.

9. A process for making a stable cheese product supplemented with functionally enhanced whey protein comprising the steps of:

(i) combining a whey protein composition with a dairy liquid to form a culturable mixture;

(ii) subjecting the mixture to a high shear homogenization and temperature treatment that is effective to functionally enhance the whey protein, such that it is substantially incorporated into the milk fat-casein structure, thereby stabilizing the culturable mixture;

(iii) culturing the stabilized mixture with a culture that provides a particular variety of cheese to form whey and a cheese product comprising a substantial proportion of the functionally enhanced whey protein, wherein the cheese product is characteristic of the particular variety of cheese;

(iv) heating the cultured mixture; and (v) separating the cheese product from the whey in the heated mixture, thereby providing a stable cheese product supplemented with functionally enhanced whey protein.

10. The process described in claim 9, wherein the dairy liquid includes cream and the particular culture provides a cream cheese product.

11. The process described in claim 9, wherein the cheese curd is characteristic of a curd chosen from the group consisting of cottage cheese, cheddar cheese, and mozzarella cheese, and the cheese product corresponds to the characteristic curd chosen.

12. The process described in claim 9, wherein the whey protein composition is a dried whey concentrate and is combined at a proportion from at least about 2 percent by weight of the total weight of the mixture to at most about 12 percent of the total weight of the mixture.

13. The process described in claim 9, wherein the whey protein composition is a liquid whey concentrate and is added at a proportion such that the whey protein solids contained therein are present at a proportion from at least about 2 percent by weight of the total weight of the mixture to at most about 12 percent by weight of the total weight of the mixture.

14. The process described in claim 9, wherein the whey protein composition is selected from selected from the group consisting of dry whey protein concentrate, liquid whey protein concentrate, whey protein isolate, liquid or dried sweet whey, liquid or dried acid whey, and mixtures thereof and wherein the whey protein composition is added at a proportion such that the whey protein solids contained therein are present at a proportion from at least about 2 percent by weight of the total weight of the mixture to at most about 12 percent by weight of the total weight of the mixture.

15. The process described in claim 9, wherein the culturable mixture is homogenized in step (ii) at a pressure from about 1,500 to about 3,500 pounds per square inch.

16. The process described in claim 15, wherein the culturable mixture is homogenized in step (ii) at a pressure from about 2,000 to about 3,000 pounds per square inch.

17. The process described in claim 9, wherein the culturable mixture is treated at a temperature from about 180 to about 220° F. for about 1 to about 10 minutes.

18. The process described in claim 17, wherein the culturable mixture is treated at a temperature from about 195 to about 205° F. for about 4 to about 6 minutes.

19. The process described in claim 9, wherein the cultured mixture is heated in step (iv) to a temperature from about 165 to about 210° F.

20. The process described in claim 19, wherein the cultured mixture is treated in step (iv) at a temperature from about 195 to about 205° F.

* * * * *

UNITED STATES PATENT AND TRADEMARK OFFICE
CERTIFICATE OF CORRECTION

PATENT NO.   : 6,558,716 B1
DATED        : May 6, 2003
INVENTOR(S)  : Kent et al.

It is certified that error appears in the above-identified patent and that said Letters Patent is hereby corrected as shown below:

<u>Column 14,</u>
Line 55, after "cream cheese", insert a -- , --.

<u>Column 16,</u>
Line 11, delete "selected from".

Signed and Sealed this

Thirtieth Day of September, 2003

JAMES E. ROGAN
*Director of the United States Patent and Trademark Office*